Figures 1, 2:
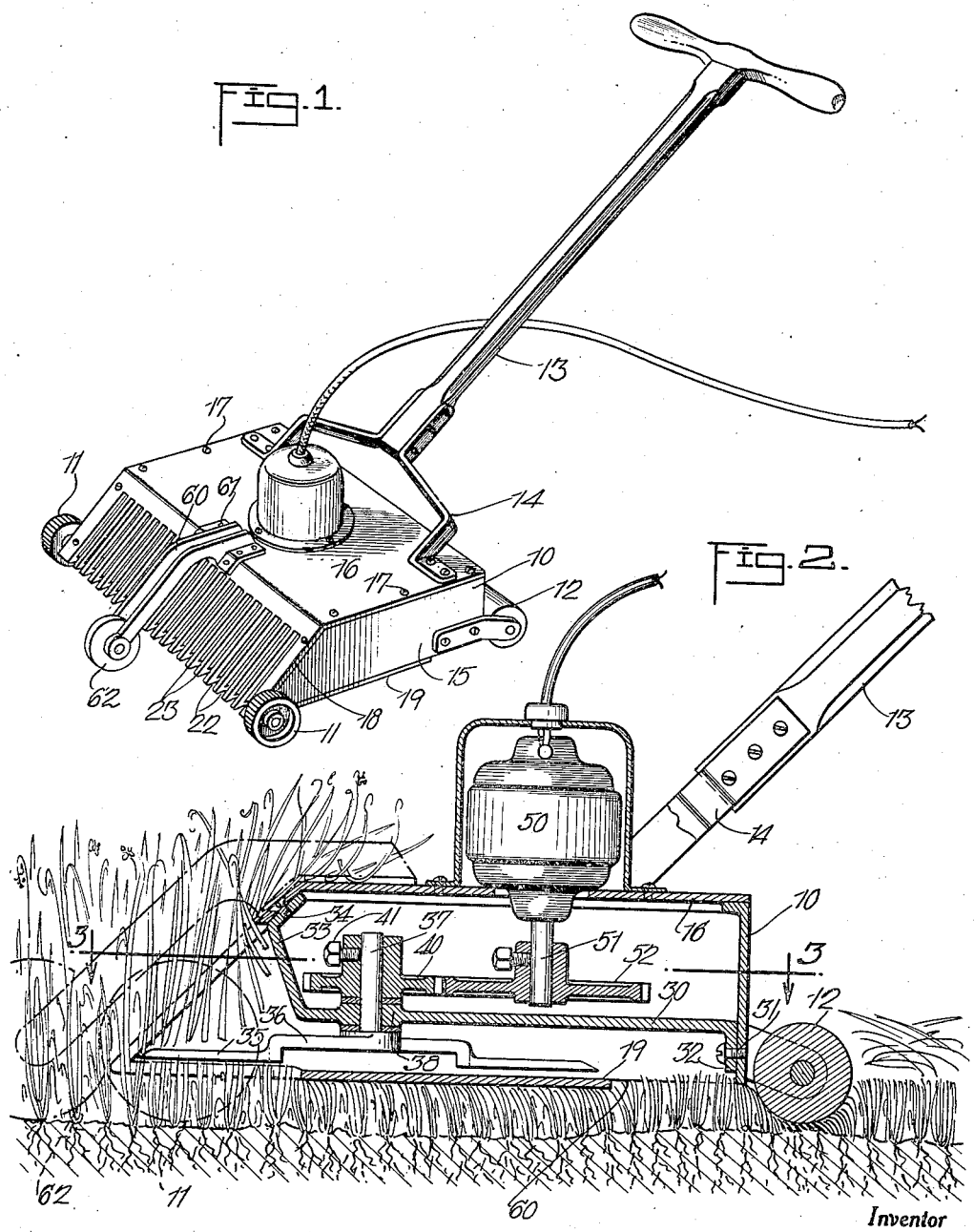

Sept. 27, 1932.      S. ROTONDO ET AL      1,880,154
LAWN MOWER
Filed Feb. 25, 1931      2 Sheets-Sheet 1

Inventor
SEBASTIANO ROTONDO,
ANTHONY ROTONDO,
By Clarence A. O'Brien
Attorney

Sept. 27, 1932.   S. ROTONDO ET AL   1,880,154
LAWN MOWER
Filed Feb. 25, 1931   2 Sheets-Sheet 2
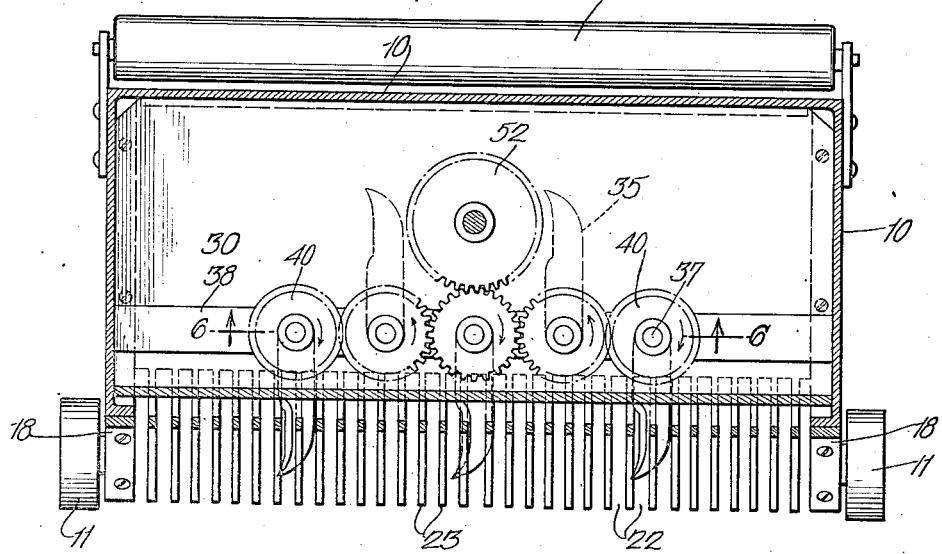
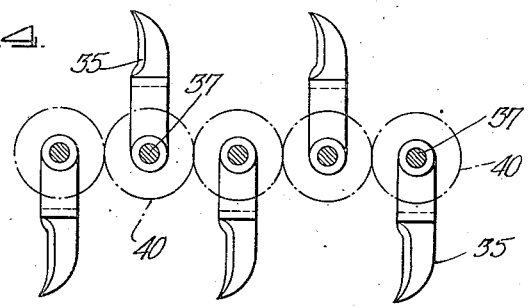
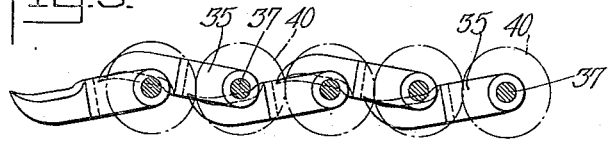
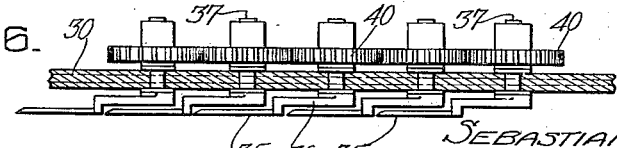
Inventor
SEBASTIANO ROTONDO,
ANTHONY ROTONDO.
By Clarence A. O'Brien
Attorney Patented Sept. 27, 1932

1,880,154

UNITED STATES PATENT OFFICE

SEBASTIANO ROTONDO AND ANTHONY ROTONDO, OF BROOKLYN, NEW YORK

LAWN MOWER

Application filed February 25, 1931. Serial No. 518,196.

The present invention relates to new and useful improvements in mowing machines, and more particularly it pertains to a hand mower for cutting lawns and the like.

It is one of the primary objects of the invention to provide a new and improved hand propelled lawn mower in which the cutting elements are operated.

It is a further object of the invention to provide a hand propelled lawn mower which will effectively cut tall grass and other vegetables grown without choking or clogging the machine.

It is a further object of the invention so to construct the machine that the grass which is severed during the cutting operation can in no way clog or otherwise affect the driving mechanism of the cutting element.

It is a still further object of the invention to provide a machine of the aforementioned character which is highly efficient in operation, economical to manufacture, and which will have but few working parts.

With the above and other objects in view, reference will be had to the accompanying drawings wherein;

Figure 1 is a perspective view of a machine constructed in accordance with the present invention, Figure 2 is a transverse sectional view taken through the housing on an enlarged scale, Figure 3 is a horizontal sectional view taken on the line 3—3 of Figure 2, Figure 4 is a diagrammatic view of the cutting elements showing their arrangement in one of their operating positions, Figure 5 is a similar view showing the cutting blades in another of their operating positions, and;

Figure 6 is a vertical sectional view taken on the line 6—6 of Figure 3.

Referring to the drawings by reference character, 10 designates a housing and this housing is preferably mounted upon rollers or the like 11 at the front and a single transversely extending roller 12 at the rear thereof. A suitable handle 13 is employed for propelling the device over the surface to be cut, and said handle may be connected to the top wall of the housing by means of arms, brackets or the like 14.

The housing 10 comprises a substantially rectangular frame-like member 15 the front wall of which is open. The top of the housing 10 may be closed by a top wall 16 which is secured in position by means of screws or other suitable fastenings 17 which pass through the top wall 16 and engage the side walls of the housing. The top wall 16 has an angularly disposed downwardly extended portion 18 and extending rearwardly from this portion, there is a wall 19 which partially closes the bottom of the rectangular frame 15 of the housing as best illustrated in Figure 2. This structure including the top wall 16, the downwardly inclined wall 18 and the bottom wall 19 provides a member which is substantially U-shaped in form and within which the housing 10 or in other words the frame 15 forming the housing 10 is adapted to be received.

The downwardly inclined portion 18 heretofore mentioned is provided with a plurality of relatively large slots or the like 22 which construction provides projecting teeth 23 which are adapted to receive the material to be cut and separate the same into cuffs or bunches in upstanding relation in order that it may be presented in this manner to the cutting elements which will be hereinafter described. As best illustrated in Figure 2, these slits extend partially through the bottom wall 19 of the frame like member and it is over this portion of the slots 22 that the cutting elements rotate in a manner to be hereinafter described.

Extending substantially the entire length of the housing 10, there is a partition 30 and said partition may be secured in position at its rear edge by means of screws or bolts 31 which pass through a downwardly turned flange 32. The forward edge of the partition 30 is bent upwardly as at 33 and is secured to the upper portion of the downwardly inclined portion 18 of the housing as at 34 in any desired manner. This partition 30 divides the housing 10 into two compartments one of which is adapted to contain the cutting elements, the other compartments being arranged to receive the driving mechanism of the cutting elements.

Each cutting element consists of a knife or the like 35 having an offset portion 36 and projecting from the offset portion 36 of each knife, there is a stud shaft or the like 37. The partition 30 is provided with a thickened portion 38 which forms a bearing or bearings for the several stud shafts 37 of the cutting elements and thus provides the means for mounting said cutting elements in the partition 30. Each of these stud shafts carries a gear 40 and the gears are secured to their respective stud shafts by means of bolts, screws or the like 41. The several gears 40 intermesh with one another and thus it will be apparent that as one of said gears is driven the entire train will be driven and the knives 35 will be rotated. The knives 35 and their offset portion 36 permit of the knives overlapping one another as shown in Figure 6 of the drawings thus permitting free passage of the knives by one another and providing a cutting operation of the knives over the entire area over which the machine travels by reason of the fact that the cutting zone of each knife overlies the cutting zone of each adjacent knife.

Means is provided to drive the cutting elements, and in the present embodiment of the invention this means consists of an electric motor 50 carried by the top wall 16 and having a downwardly extending shaft 51 upon the lower end of which there is secured a gear 52 by means of a set screw or the like 53. This gear 52 meshes with one of the gears 40 of the knives 35, and it will thus be apparent that when the motor is operated, the gear 52 will be rotated and by reason of its engagement with one of the gears 40, the entire train of gears 40 will be driven with the result that the knives 35 will be rotated over the lower portion of the fingers 23 and thus sever the grass or other material which lies in the spaces 22 between said fingers.

The material cut rides up the inclined wall 18 and passes over the machine and any portion thereof which may enter the lower housing which houses the blade 35, is thrown to the rear thereof by the blades where it is discharged through the opening 60 provided by the termination of the rear end of the member 19.

A bracket 60 is secured as at 61 to the top wall 16 and this bracket extends forwardly and downwardly to a position in front of the teeth 23. In the lower end of the bracket 60, a roller 62 is mounted and is adapted to engage the surface over which the machine is moved during operation thereof. Thus, if the machine, during operation is passed over a raised portion in the surface, the roller by reason of its engagement therewith, will elevate the cutting blades so that they do not engage said raised portion as would be the case if the roller 62 were not employed.

From the foregoing it will be apparent that the present invention provides a hand propelled lawn mower in which a plurality of rotary blades are power driven. Furthermore, the invention provides a lawn mower which will sever tall grass, weeds and the like an operation of which the conventional type of lawn mower is not capable.

While the invention has been herein illustrated in a preferred form, it is to be understood that the invention is not to be limited to the specific construction herein shown, and that it may be practiced in other forms without departing from the spirit thereof.

Having thus described the invention, what is claimed as new and what it is desired to secure by Letters Patent of the United States, is:

1. A mowing device of the class described comprising a substantially rectangular shaped housing including sides, an end member, a top member, a forwardly and downwardly sloping front member and a bottom member extending rearwardly from the lower edge of the front member to a point spaced forwardly from the lower edge of the rear member, said front member and the front part of the bottom member having vertically arranged slots therein spaced apart, the slots in the bottom member forming continuations of the slots in the front member, roller means connected to the housing for supporting the same in spaced relation from the ground, an arm connected to the central part of the top portion of the housing and extending forwardly and downwardly, a roller at the forward end of said arm for contacting the ground, cutting means located in the forward part of the housing and located slightly above the front portion of the bottom member whereby the said cutting means will cut the material extending through the slots in the front and bottom members, the material entering the housing passing rearwardly therethrough and dropping through the opening formed by the rear end of the bottom member and the lower edge of the rear member.

2. In a mowing device of the class described, a member having slots in its forward part, a supporting member, a plurality of vertically arranged shafts journalled in said supporting member, a cutting member carried by each shaft, each cutting member comprising a shank having one end connected to a shaft, and its other end bent at right angles and a blade connected to said bent part whereby the shank is offset from the blade and the blade of one member extends past the shank of another member, said blades being located in the same horizontal plane, and the shafts being arranged in a vertical row, gears connected with the shafts, said gears meshing with each other, and means for imparting movement to one of the gears.

SEBASTIANO ROTONDO.
ANTHONY ROTONDO.